US005987562A

United States Patent [19]

Glover

[11] Patent Number: 5,987,562

[45] Date of Patent: Nov. 16, 1999

[54] WAVEFORM SAMPLER AND METHOD FOR SAMPLING A SIGNAL FROM A READ CHANNEL

[75] Inventor: Kerry C. Glover, Wylie, Tex.

[73] Assignee: Texas Instruments Incorporated, Dallas, Tex.

[21] Appl. No.: 08/813,125

[22] Filed: Mar. 7, 1997

[51] Int. Cl.[6] .......... G06F 12/00

[52] U.S. Cl. .......... 711/4; 375/345; 455/234.1

[58] Field of Search .......... 324/76.12, 212; 375/345, 316; 360/65, 46; 330/279; 341/141; 325/341; 711/4; 455/234.1

[56] References Cited

U.S. PATENT DOCUMENTS

| | | | |
|---|---|---|---|
| 4,797,936 | 1/1989 | Nakatsugawa et al. | 324/76.12 |
| 5,297,184 | 3/1994 | Behrens et al. | 375/345 |
| 5,341,249 | 8/1994 | Abbott et al. | 360/46 |
| 5,406,429 | 4/1995 | Noguchi et al. | 360/65 |
| 5,422,601 | 6/1995 | Kovacs et al. | 330/279 |
| 5,424,638 | 6/1995 | Huber | 324/212 |
| 5,532,885 | 7/1996 | Okamura | 360/46 |
| 5,546,245 | 8/1996 | Sato | 360/65 |
| 5,585,975 | 12/1996 | Bliss | 360/65 |
| 5,671,252 | 9/1997 | Kovacs et al. | 375/316 |
| 5,703,584 | 12/1997 | Hill | 341/141 |
| 5,768,320 | 6/1998 | Kovacs et al. | 375/341 |

OTHER PUBLICATIONS

"A Class of Partial Response Systems for Increasing Storage Density in Magnetic Recording", Thapar et al., *IEEE Transactions on Magnetics,* vol. MAG–23, No. 5, Sep. 1987, pp. 3666–3668.

"A (D.K.C.)=(0.3,5/2) Rate R/10 Modulation Code", Fredrickson, *IEEE,* 1990, pp. 2318–2320.

"A Generalized Scheme For Generating And Detecting Recording Channel Output Waveforms With Controlled Pulse Polarity", French et al., *IEEE Transactions on Magnetics,* vol. 24, No. 6, Nov. 1988, pp. 2530–2532.

"A Maximum Likelihood Detector for Nonlinear Magnetic Recording", Fitzpatrick et al., *IEEE Transactions on Magnetics,* vol. 27, No. 6, Nov. 1991, pp. 4816–4818.

"A Maximum Likelihood Peak Detecting Channel", Chopra et al., *IEEE Transactions on Magnetics,* vol. 27, No. 6, Nov. 1991, pp. 4819–4821.

"A New Digital Signal Processing Channel For Data Storage Products", Patel, *IEEE Transactions on Magnetics,* vol. 27, No. 6, Nov. 1991, pp. 4579–4584.

"A New Runlength Limited Code For Binary Asymmetric Channels", Menyennett et al., *IEEE,* 1992, pp. 2901–2903.

"A Post–Compensation Scheme For Peak–Detect Channel", Sutardja, *IEEE Transactions on Magnetics,* vol. 26, No. 5, Sep. 1990, pp. 2303–2305.

"A PRML System For Digital Magnetic Recording", *IEEE Journal on Selected Areas in Communications,* vol. 10, No. 1 Jan. 1992, pp. 38–56.

(List continued on next page.)

*Primary Examiner*—John W. Cabeca
*Assistant Examiner*—Fred F. Tzeng
*Attorney, Agent, or Firm*—W. Daniel Swayze, Jr.; Wade James Brady, III; Richard L. Donaldson

[57] ABSTRACT

A read channel (18) having a waveform sampler (58) is provided for use in a disk drive mass storage system (30). The disk drive mass storage system (30) includes a disk/head assembly (12), a preamplifier (14), and a control circuitry (11). The read channel (18) is coupled to the control circuitry (11) through a data/parameter path (13). The read channel (18) includes a plurality of circuit modules for processing a waveform data signal received from the preamplifier (14) and to generate a digital data signal in response. The read channel provides the digital data signal to the control circuitry (11) through the data/parameter path (13). The read channel (18) also includes the waveform sampler (58) for receiving and sampling a processed waveform signal from one of the plurality of circuit modules and for generating a digital waveform sampler signal in response. The read channel can provide either the digital data signal or the digital waveform sampling signal as an output onto the data/parameter path (13).

16 Claims, 3 Drawing Sheets

OTHER PUBLICATIONS

"A Simple Statistical Model of Partial Erasure in Thin Film Disk Recording Systems", Barndt et al., *IEEE Transactions on Magnetics,* vol. 27, No. 6, Nov. 1991, pp. 4978–4980.
"A Simulation Study of Adaptive Reception Schemes for High–Density Digital Magnetic Storage", Bergmans et al., *IEEE Transactions on Magnetics,* vol. 27, No. 1, Jan. 1991, pp. 717–723.
"A Survey of Codes for Partial Response Channels", Wolf, *IEEE Transactions on Magnetics,* vol. 27, No. 6, Nov. 1991 pp. 4585–4589.
A Technique for Measuring Nonlinear Bit Shift, Tsang, *IEEE Transactions on Magnetics,* vol. 27, No. 6, Nov. 1991 pp. 5316–5318.
"ACT–enabled 100MHz Channel Equalizer", Kumar et al., *IEEE Transactions on Magnetics,* vol. 27, No. 6, Nov. 1991 pp. 4799–4803.
"Adaptive Maximum–Likelihood Receiver for Carrier–Modulated Data–Transmission Systems", Ungerboeck, *IEEE Transactions on Communications,* vol. COM–22, No. 5, May 1974, pp. 624–636.
"An Estimation Technique for Accurately Modeling The Magnetic Recording Channel Including Nonlinerarities", *IEEE Transactions on Magnetics,* vol. 25, No. 5, Sep. 1989, pp. 4084–4086.
"An Experimental 180 Mb/sec PRML Channel for Magnetic Recording", Hong et al., *IEEE Transactions on Magnetics,* vol. 27, No. 6, Nov. 1991, pp. 4532–4537.
"Analysis Of Asymmetric Deterministic Bitshift Errors In A Hard Disk File", Nunnelley et al., *IEEE Transactions on Magnetics,* vol. 26, No. 5, Sep. 1990, pp. 2306–2308.
"Application of Partial–response Channel Coding to Magnetic Recording Systems", Kobayashi et al., *IBM J. Res Develop.,* Coding for Magnetic Recording, Jul. 1970, pp. 368–375.
"Characterization of Digital Recording Channels by Means of Echo Cancellation Techniques", Bergmans et al., *IEEE Transactions on Magnetics,* vol. 25, No. 5, Sep. 1989, pp. 4078–4080.
"Coding for Maximum Likelihood Detection on a Magnetic Recording Channel", Fredrickson, *IEEE Transactions on Magnetics* vol. 26, No. 5, Sep. 1990, pp. 2315–2317.
"Combined ECC/RLL Codes", Lin et al., *IEEE Transactions on Magnetics,* vol. 24, No. 6, Nov. 1988, pp. 2527–2529.
"Comparative Performance Between Drop–Out Detection and Viterbi Reliability Metric Erasure Flagging", Ryan, *IEEE Transactions on Magnetics,* vol. 28, No. 5, Sep. 1992, pp. 2898–2900.
"Comparison of Computationally Efficient Forms of FDTS/DF Against PR4–MI", Carley et al., *IEEE Transactions on Magnetic* vol. 27, No. 6, Nov. 1991, pp. 4567–4572.
"Considerations for High Data Rate Recording With Thin–Film Heads", Wood et al., *IEEE Transactions on Magnetics,* vol. 26, No. 6, Nov. 1990, pp. 2954–2959.
"Contributions to the Application of the Viterbi Algorithm", Burkhardt et al., *IEEE Transactions on Information Theory,* vol. IT–31, No. 5, Sep. 1985, pp. 626–634.
"Discrete–Time Modeling of Transition–Noise Dominant Channels and Study of Detection Performance", Moon, *IEEE Transactions on Magnetics,* vol. 27, No. 6, Nov. 1991, pp. 4573–4578.
"Distance Preserving Run–Length Limited Codes", French, *IEEE Transactions on Magnetics,* vol. 25, No. 5, Sep. 1989, pp. 4093–4095.
"Enhanced Decision Feedback Equalization", Wood, *IEEE Transactions on Magnetics,* vol. 26, Sep. 1990, Total Pgs. 2.
"Error Detecting Multiple Block (d,k) Codes", Fredrickson et al., *IEEE Transactions on Magnetics,* vol. 25, No. 5, Sep. 1989, pp. 4096–4098.
"Error Rate Performance of Experimental Gigabit Per Square Inch Recording Components", *IEEE Transactions on Magnetics,* vol. 26, No. 5, Sep. 1990, pp. 2298–2302.
"Experimental Studies of Nonlinearities in High Density Disk Recording", Lin et al., *IEEE Transactions on Magnetics,* vol. 28, No. 5, Sep. 1992, pp. 3279–3281.
"Evaluation of Magnetic Recording Detection Schemes for Thin Film Media", Kenney et al., *IEEE Transactions on Magnetics,* vol. 27, No. 6, Nov. 1991, pp. 4822–4824.
"Feed–Forward Timing Recovery for Digital Magnetic Recording", Raghaven et al., *IEEE Transactions for Magnetic Recording,* 1991, pp. 0794–0797.
"Identification of Nonlinear Write Effects Using Pseudorandom Sequences", Palmer et al., *IEEE Transactions on Magnetics,* vol. MAG–23, No. 5, Sep. 1987, pp. 2377–2379.
"Implementation of PRML in a Rigid Disk Drive", Coker, *IEEE Transactions on Magnetics,* vol. 27, No. 6, Nov. 1991, pp. 4538–4543.
"Jitter Vs. Additive Noise in Magnetic Recording Effects on Detection", Wood, *IEEE Transactions on Magnetics,* vol. MAG–23, No. 5, Sep. 1987, pp. 2683–2685.
"Low–Complexity Viterbi Detection for a Family of Partial Response Systems", Shafiee et al., *IEEE Transactions on Magnetics,* vol. 28, No. 5, Sep. 1992, pp. 2892–2894.
"Magnetic Characterization Using Elements of a PRML Channel", Coker et al., *IEEE Transactions on Magnetics,* vol. 27, No. 6, Nov. 1991, pp. 4544–4548.
"Magnetic Recording Channel Front–Ends", Klaasen, *IEEE Transactions on Magnetics,* vol. 27, No. 6, Nov. 1991, pp. 4503–4508.
"Matched Filter Limits and Code Performance in Digital Magnetic Recording", Koren, *IEEE Transactions on Magnetics,* vol. 27, No. 6, Nov. 1991, pp. 4594–4599.
"Maximum–Likelihood Sequence Estimation of Digital Sequences in the Presence of Intersymbol Interference", Forney, *IEEE Transactions on Information Theory,* vol. IT–18, No. 3, May 1972, pp. 363–378.
"Measurement of Noise in Magnetic Media", Baugh et al., *IEEE,* pp. 1722–1724.
"Media Design Considerations for a PRML Channel", Palmer et al., *IEEE Transactions on Magnetics,* vol. 29, No. 1, Jan. 1993, pp. 189–194.
"Media Design for User Density of Up to 3 Bit Per Pulse Width", Simmons et al., *IEEE Transactions on Magnetics,* vol. 29, No. 1, Jan. 1993, pp. 169–176.
"Media Selection for High Density Recording Channels", Barndt, et al., *IEEE Transaction on Magnetics,* vol. 29, No., 1 Jan. 1993, pp. 183–188.
"Modeling and Signal Processing for the Nonlinear Thin Film Recording Channel", Brandt, et al. *IEEE Transactions on Magnetics,* vol. 28, No. 5, Sep. 1992, pp. 2710–2712.
"Modified Viterbi Algorithm for a Jitter–dominant $1–D^2$ Channel", Zeng, et al., *IEEE Transactions on Magnetics,* vol. 28, No. 5, Sep. 1992, pp. 2895–2897.
"New Detector for 1,k Codes Equalized to Class II Partial Response", Wood, *IEEE Transactions on Magnetics,* vol. 25, No. 5, Sep. 1989, pp. 4075–4077.
"Noise Autocorrelation in High Density Recording on Metal Film Disks", Tang, *IEEE Transactions on Magnetics,* vol. MAG–22. Sep. 1986, pp. 883–385.

"Noise Autocorrelation in Magnetic Recording Systems", Tang, *IEEE Transactions on Magnetics,* vol. MAG–21, Sep. 1985, pp. 1389–1393.

"Noise in a Thin Metallic Medium: The Connection with Nonlinear Behaviour", Melas, et al., *IEEE Transactions on Magnetics,* vol. 24, No. 6, Nov., pp. 2712–2714.

"Nonlinear Effects of Transition Broadening", Moon, et al., *IEEE Transactions on Magnetics,* vol. 27, No. 6, Nov. 1991, pp. 4831–4833.

"Nonlinearities in Thin–Film Media and Their Impact on Data Recovery", Moon, et al., *IEEE Transactions on Magnetics.,* vol. 29, No. 1, Jan. 1993, pp. 177–182.

"Nonlinear Superposition in Saturation Recording of Disk Media", Melas, et al., *IEEE Transactions on Magnetics,* vol. MAG–23, MAG–23, No. 5, Sep. 1987, pp. 2079–2081.

"On Feed–Forward and Feedback Timing Recovery for Digital Magnetic Recording Systems", Raghaven, et a;., *IEEE Transactions on Magnetics,* vol. 27, No. 6, Nov. 1991, pp. 4810–4812.

"On the Performance of a Rate 8/10 Matched Spectral Null Code for Class–4 Partial Response", Thapar, et al., *IEEE Transactions on Magnetics,* vol. 28, No. 5, Sep. 1992, pp. 2883–2888.

"Partial–Response Signaling", Kabal, et al., *IEEE Transactions on Communications,* vol. COM–23, No. 5, Sep. 1975, pp. 921–934.

"Partial Response Signaling in a Magnetic Recording Channel", Moon, et al., *IEEE Transactions on Magnetics,* vol. 24, No. 6, Nov. 1988, pp. 2973–2975.

"Performance and Sensitivity Analysis of Maximum–Likehood Sequence Detection on Magnetic Recording Channels", Dollvo, et al., *IEEE Transactions on Magnetics,* vol. 25, No. 5, Sep. 1989, pp. 4072–4074.

"Performance Comparison of Detection Methods in Magnetic Recording", Moon, et al., *IEEE Transactions on Magnetics,* vol. 26, No. 6, Nov. 1990, pp. 3155–3172.

"Performance Degradation of PRML Channels Due To Nonlinear Distortions", Ziperovich, *IEEE Transactions on Magnetics,* vol. 27, No. 6, Nov. 1991, pp. 4825–4827.

"Performance Evaluation of a New Coding Scheme for the Peak Detecting Magnetic Recording Channel", Armstrong, et al., *IEEE Transactions on Magnetics,* vol. 27, No. 6, Nov. 1991, pp. 4804–4806.

"Performance of Digital Magnetic Recording with Equalization and Offtrack Interference", Abbott et al., *IEEE Transactions on Magnetics,* vol. 27, No. 1, Jan. 1991, pp. 705–716.

"Results on 'Controlled Polarity' Modulation and Coding", Weathers et al., *IEEE Transactions on Magnetics,* vol. 25, No. 1, Sep. 1989, pp. 4090–4092.

"Spectral Shaping For Peak Detection Equalization", Thapar et al., *IEEE Transactions on Magnetics,* vol. 26, No. 5, Sep. 1990, pp. 2309–2311.

"Sequence (Viterbi–Equivalent) Decoding", Schneider, Richard C., *IEEE Transactions on Magnetics,* vol. 24, No. 6, Nov. 1988, pp. 2539–2541.

"Statistical Detection for Communication Channels with Intersymbol Interference", Abend, et al., *Processings of the IEEE,* vol. 58, No. 5, May 1970, pp. 779–785.

"Shift Error Correcting Modulation Codes", Hilden, et al., *IEEE Transactions on Magnetics,* vol. 27, No. 6, Nov. 1991, pp. 4600–4605.

"Signal–to–Noise Ratio Degradation with Channel Mismatch", Moon, et al., *IEEE Transactions on Magnetics,* vol. 27, No. 6, Nov. 1991, pp. 4837–4839.

"The Choice of the Desired Impulse Response in Combined Linear–Viterbi Algorithm Equalizers", Beare, *IEEE Transactions on Communications,* vol. COM–26, No. 8, Aug. 1978, pp. 1301–1307.

"The Viterbi Algorithm", Forney, *Proceedings of the IEEE,* vol. 61, No. 3, Mar. 1973, pp. 268–278.

"Time–Domain Study of Proximity–Effect Induced Transition Shifts", Tsang, et al., *IEEE Transactions on Magnetics,* vol. 27, No. 2, Mar. 1991, pp. 795–802.

"Viterbi Detection of Class IV Partial Response on a Magnetic Recording Channel", Wood, et al., *IEEE Transactions on Communications,* vol. COM–34, No. 5, May 1986, pp. 454–461.

"Viterbi Detection of Matched Spectral Null Codes for PR4 Systems", Frederickson, *IEEE Transactions on Magnetics,* 1992 pp. 2889–2891.

"Volterra Modeling of Digital Magnetic Saturation Recording Channels", Hermann, *IEEE Transactions on Magnetics, IEEE Transactions on Magnetics,* vol. 26, No. 5, Sep. 1990, pp. 2125–2127.

"Write Equalization for Generalized (d,k) Codes", Schneider, *IEEE Transactions on Magnetics,* vol. 24, No. 6, Nov. 1988, pp. 2533–2535.

WAVEFORM SAMPLER AND METHOD FOR SAMPLING A SIGNAL FROM A READ CHANNEL

TECHNICAL FIELD OF THE INVENTION

This invention relates generally to the field of information storage and more particularly to a waveform sampler and method for sampling a signal from a read channel.

BACKGROUND OF THE INVENTION

As computer hardware and software technology continues to progress, the need for larger and faster mass storage devices for storing computer software and data continues to increase. Electronic databases and computer applications such as multimedia applications require large amounts of disk storage space. An axiom in the computer industry is that there is no such thing as enough memory and disk storage space.

To meet these ever increasing demands, hard disk drives continue to evolve and advance. Some of the early disk drives had a maximum storage capacity of five megabytes and used fourteen inch platters, whereas today's hard disk drives are commonly over one gigabyte and use 3.5 inch platters. Correspondingly, advances in the amount of data stored per unit of area, or areal density, have dramatically accelerated. For example, in the 1980's, areal density increased about thirty percent per year while in the 1990's annual areal density increases have been around sixty percent. The cost per megabyte of a hard disk drive is inversely related to its areal density.

Mass storage device manufacturers strive to produce high speed hard disk drives with large data capacities at lower and lower costs. A high speed hard disk drive is one that can store and retrieve data at a fast rate. One aspect of increasing disk drive speed and capacity is to improve or increase the areal density. Areal density may be increased by improving the method of storing and retrieving data.

In general, mass storage devices, such as hard disk drives, include a magnetic storage media, such as rotating disks or platters, a spindle motor, read/write heads, an actuator, a pre-amplifier, a read channel, a write channel, a servo controller, and control circuitry to control the operation of the hard disk drive and to properly interface the hard disk drive to a host or system bus. The read channel, write channel, servo controller, and memory may all be implemented as one integrated circuit that is referred to as a data channel. The control circuitry often includes a microprocessor for executing control programs or instructions during the operation of the hard disk drive.

A hard disk drive (HDD) performs write and read operations when storing and retrieving data. A typical HDD performs a write operation by transferring data from a host interface to its control circuitry. The control circuitry then stores the data in a local dynamic random access memory (DRAM). A control circuitry processor schedules a series of events to allow the information to be transferred to the disk platters through a write channel. The control circuitry moves the read/write heads to the appropriate track and locates the appropriate sector of the track. Finally, the HDD control circuitry transfers the data from the DRAM to the located sector of the disk platter through the write channel. The write channel may encode the data so that the data can be more reliably retrieved later. A sector generally has a fixed data storage capacity, such as 512 bytes of user data per sector.

In a read operation, the appropriate sector to be read is located and data that has been previously written to the disk is read. The read/write head senses the changes in the magnetic flux of the disk platter and generates a corresponding analog read signal. The read channel receives the analog read signal, conditions the signal, and detects "zeros" and "ones" from the signal. The read channel conditions the signal by amplifying the signal to an appropriate level using automatic gain control (AGC) techniques. The read channel then filters the signal, to eliminate unwanted high frequency noise, equalizes the channel, detects "zeros" and "ones" from the signal, and formats the binary data for the control circuitry. The binary or digital data is then transferred from the read channel to the control circuitry and is stored in the DRAM of the control circuitry. The processor then communicates to the host that data is ready to be transferred. When data is being either read or written in a HDD, data is exchanged between the control circuitry and the read channel. This data exchange occurs over a data path operating at a high speed.

As the disk platters are moving, the read/write heads must align or stay on a particular track. This is accomplished by reading information from the disk called a servo wedge. Generally, each sector has a corresponding servo wedge. The servo wedge indicates the position of the heads. The data channel receives this position information so the servo controller can continue to properly position the heads on the track.

Traditional HDD read channels used a technique known as peak detection for extracting or detecting digital information from the analog information stored on the magnetic media. In this technique, the waveform is level detected and if the waveform level is above a threshold during a sampling window, the data is considered a "one". More recently, advanced techniques utilizing discrete time signal processing (DTSP) to reconstruct the original data written to the disk are being used in read channel electronics to improve areal density. In these techniques, the data is synchronously sampled using a data recovery clock. The sample is then processed through a series of mathematical manipulations using signal processing theory.

There are several types of synchronously sampled data (SSD) channels. Partial response, maximum likelihood (PRML); extended PRML (EPRML); enhanced, extended PRML (EEPRML); fixed delay tree search (FDTS); and decision feedback equalization (DFE) are several examples of different types of SSD channels using DTSP techniques. The maximum likelihood detection performed in several of these systems is usually performed by a Viterbi decoder implementing the Viterbi algorithm, named after Andrew Viterbi who developed it in 1967.

The SSD channel generally requires mixed-mode circuitry for performing a read operation. The circuitry may perform such functions as analog signal amplification, automatic gain control (AGC), continuous time filtering, signal sampling, DTSP manipulation, timing recovery, signal detection, and formatting. The data channel circuitry, including both a read channel and a write channel, may be implemented on a single integrated circuit package that contains various input and output (I/O) pins.

In all of the SSD channels, the major goal during a read operation is to accurately retrieve the data with the lowest bit error rate (BER) in the highest noise environment. The SSD channel which does this best is the optimal channel for use in a system which results in the ability to greatly increase the storage capacity of a mass storage system. Much of the SSD channel performance is dependent upon various physical properties and characteristics of the individual disk storage medium and read/write heads that vary from one system to another. Each disk storage medium and read/write head is unique with individual physical and magnetic characteristics. The various properties and characteristics cannot be sufficiently controlled during manufacture to ensure uniformity. The SSD channel circuitry may also vary from one channel to the other resulting in the introduction of undesirable characteristics into the channel circuitry. Over time, the various physical properties and characteristics of the mass storage system or HDD may change also resulting in decreased performance.

SSD channel performance during read operations may be optimized or enhanced by using various operational parameters in the read channel circuitry to account for the unique physical and magnetic characteristics of each HDD system. The read channel circuitry includes a plurality of circuit modules for processing the waveform data signal. Some of these circuit modules may use operational parameters to enhance or optimize their performance. For example, filter coefficients or operational parameters may be used by the finite impulse response filter (FIR) of the read channel to adapt or equalize the FIR filter to accommodate for the unique properties of a particular HDD system so that the desired channel performance is provided. The operational parameters can be calculated for each system to obtain optimal HDD performance. These calculations may be done at the time of manufacture, during burn-in, and at various times during the life of the HDD as needed to account for the physical and magnetic characteristics that vary over time.

The calculation of these operational parameters involves writing known data to a location on the HDD and analyzing one or more of the read channel waveform signals generated by the various read channel circuit modules in response to reading the waveform data signal generated from the known data. These read channel waveform signals must be accessed and sampled, and then analyzed using processing circuitry. Accessing the needed read channel waveform signals is difficult and cumbersome. Many of the needed read channel waveform signals are internal signals that are not externally accessible from the read channel. Other read channel signals may be accessible through dedicated I/O pins or serial ports having limited bandwidth and requiring added circuitry. If processing circuitry is established within the read channel to process the sampled signals, the size and cost of read channel circuitry is greatly increased.

Even though certain read channel signals may be accessible externally through I/O pins, extensive manpower and sophisticated equipment is necessary to set up the external processing circuitry needed to sample the appropriate read channel signals and to calculate the corresponding operational parameters. Processing circuitry and software routines must be provided to calculate the operational parameters once the proper signals are sampled. The processing circuitry may include a microprocessor for analyzing the sampled waveform signals and calculating the corresponding operational parameters. The problem of sampling and processing the various read channel waveform signals becomes even more burdensome and expensive to solve after manufacture when untrained users are performing the steps and when the various read channel signals may be unaccessible. Additional problems surround the method in which the read channel signals are supplied to the processing circuitry. The data paths provided by the I/O pins are of limited bandwidth and may increase the time needed to calculate the operational parameters. Thus, significant problems exist in accessing read channel signals and providing circuitry to sample and process the signals so that operational parameters may be calculated.

SUMMARY OF THE INVENTION

From the foregoing it may be appreciated that a need has arisen for an improved waveform sampler and method for sampling a signal from a read channel. In accordance with the present invention, a waveform sampler and method is provided which substantially eliminates and reduces the disadvantages and problems described above. The present invention allows any of a variety of internal read channel waveform signals to be easily accessed and sampled during a read operation. Operational parameters may then be calculated using existing processing circuitry that is included as part of the control circuitry of the mass storage system. Thus, operational parameters may be easily and efficiently calculated by accessing and sampling any one of the variety of signals generated by the various circuity modules of the read channel during a read operation. The sampled signal may then be provided to the existing mass storage system control circuitry for processing using the same data/parameter path that is used to exchange digital data between the control circuitry and read channel during normal read operations. The present invention eliminates the need for providing processing circuitry within the read channel or for externally monitoring read channel signals and using external processing circuitry to calculate the operational parameters.

According to the present invention, a read channel for use in a mass storage system is provided that includes a plurality of circuit modules, a waveform sampler, and selection circuitry. The plurality of circuit modules are operable to receive and process a waveform data signal and to generate a digital data signal in response. The waveform sampler receives a processed waveform signal from one of the plurality of circuit modules and samples the processed waveform signal. The waveform sampler generates a digital waveform sampler signal therefrom. The selection circuitry selects and provides either the digital data signal or the digital waveform sampler signal onto a data/parameter path.

The present invention provides various technical advantages over previously developed waveform samplers and methods for sampling signals from the read channel of a mass storage system. For example, a technical advantage of the present invention includes the ability to easily and quickly sample any of a variety of internal read channel signals during a read operation and to provide the sampled signal to processing circuitry through a data/parameter path so that various operational parameters may be quickly and conveniently calculated. These operational parameters may then be used by the read channel circuitry to optimize read channel performance. Another technical advantage includes the elimination of dedicated internal circuitry to sample and process read channel signals. Other technical advantages are readily apparent to one skilled in the art from the following figures, description, and claims.

BRIEF DESCRIPTION OF THE DRAWINGS

For a more complete understanding of the present invention, and the advantages thereof, reference is now made to the following brief description, taken in connection with the accompanying drawings and detailed description, wherein like reference numerals represent like parts, in which.

DETAILED DESCRIPTION OF THE INVENTION

Figure 1:
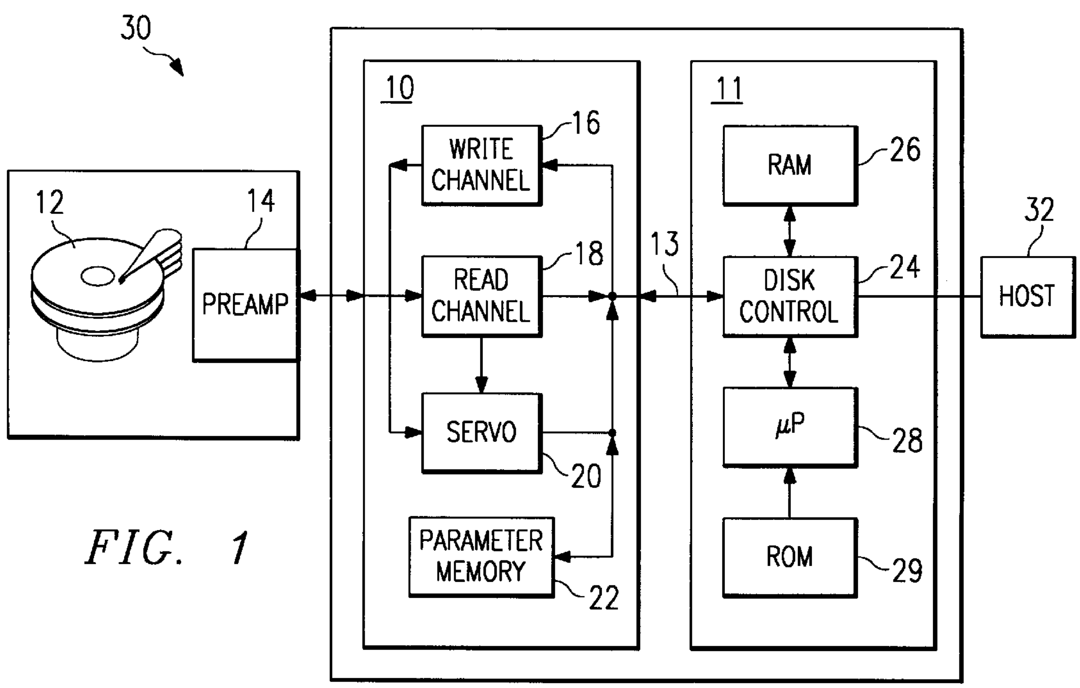
FIG. 1 is a block diagram illustrating a disk drive mass storage system.

FIG. 1 is a block diagram of a disk drive mass storage system 30 used for retrieving data during read operations and for storing data during write operations. Disk drive mass storage system 30 interfaces and exchanges data with a host 32 during read and write operations. Disk drive mass storage system 30 includes a disk/head assembly 12, a preamplifier 14, a synchronously sampled data (SSD) channel 10, and a control circuitry 11. Disk/head assembly 12 and preamplifier 14 are used to magnetically store data. SSD channel 10 and control circuitry 11 are used to process data that is being read from and written to disk/head assembly 12 and to control the various operations of disk drive mass storage system 30. SSD channel 10 and control circuitry 11 are coupled through data/parameter path 13. Data/parameter path 13 is a parallel path used to exchange data and operational parameters. Host 32 exchanges digital data with control circuitry 11.

Disk/head assembly 12 includes a number of rotating magnetic disks or platters used to store data that is represented as magnetic transitions on the magnetic platters. The magnetic platters are rotated by a spindle motor. The read/write heads of disk/head assembly 12 are used to store and retrieve data from each side of the magnetic platters. The read/write heads may be any number of available read/write heads such as magneto-resistive heads. Preamplifier 14 interfaces between the read/write heads of disk/head assembly 12 and SSD channel 10 and provides amplification to the waveform data signals as needed.

SSD channel 10 is used during read and write operations to exchange analog data signals with disk/head assembly 12 through preamplifier 14 and to exchange digital data signals with control circuitry 11 through a data/parameter path 13. Operational parameters may also be provided to SSD channel 10 from control circuitry 11 through data/parameter path 13 during start-up. SSD channel 10 includes a write channel 16, a read channel 18, a servo control 20, and a parameter memory 22 used for storing the operational parameters supplied from control circuitry 11 through data/parameter path 13. SSD channel 10 may be implemented as a single integrated circuit.

During write operations, write channel 16 receives digital data from control circuitry 11 in parallel format through data/parameter path 13. The digital data is reformatted or coded for storage and provided to disk/head assembly 12. Write channel 16 may include a register, a scrambler, a phase locked loop, an encoder, a serializer, and a write precompensation circuit. The operation and timing of write channel 16 is controlled by a write clock signal.

During read operations, read channel 18 receives analog data signals from disk/head assembly 12 through preamplifier 14. Read channel 18 conditions, decodes, and formats the analog data signal and provides a digital data signal in parallel format to control circuitry 11 through data/parameter path 13. Read channel 18 includes any of a variety of circuit modules such as an automatic gain control circuit, a low pass filter, a variable frequency oscillator, a sampler, an equalizer, such as a finite impulse response filter, a maximum likelihood, partial response detector, a deserializer, and a synchronization field detection circuit. During a read operation, many of the circuit modules of read channel 18, such as the finite impulse response filter and low pass filter, may receive operational parameters or coefficients that are used to optimize or adapt their operation in a desired manner. The operational parameters are designed to account for the various physical and magnetic characteristics of disk drive mass storage system 30 that vary from system to system and influence operational performance. The operational parameters have been previously stored in parameter memory 22 during start-up and may be accessed by the various circuit modules of read channel 18 for use during read operations.

Servo control 20 provides position error signals (PES) to control circuitry 11 during read and write operations. The PES relate to the position of the heads of disk/head assembly 12 so that the heads can be properly positioned during both read and write operations.

Control circuitry 11 is used to control the various operations of disk drive mass storage system 30 and to exchange digital data with SSD channel 10 and host 32. Control circuitry 11 includes a microprocessor 28, a disk control 24, a random access memory (RAM) 26, and a read only memory (ROM) 29. Microprocessor 28, disk control 24, RAM 26, and ROM 29 together provide control and logic functions to disk drive mass storage system 30 so that data may be received from host 32, stored, and later retrieved and provided back to host 32. ROM 29 includes preloaded microprocessor instructions for use by microprocessor 28 in operating and controlling disk drive mass storage system 30. ROM 29 may also store the operational parameters that are supplied to parameter memory 22 during start-up. RAM 26 is used for storing digital data received from host 32 before the digital data is supplied to SSD channel 10 for a write operation. RAM 26 also serves to store digital data received from SSD channel 10 before being supplied to host 32 after a read operation. RAM 26 may also provide data to microprocessor 28 and store data or results calculated by microprocessor 28. Disk control 24 includes various logic and bus arbitration circuitry used in properly interfacing disk drive mass storage system 30 to host 32 and for internally interfacing control circuitry 11 to SSD channel 10. Depending on the circuit implementation, any of a variety of circuitry may be used in disk control 24.

In operation, disk drive mass storage system 30 goes through an initialization or start-up routine when power is initially provided. One such routine instructs microprocessor 28 to supply operational parameters, previously stored in ROM 29, to parameter memory 22 of SSD channel 10 through data/parameter path 13. The operational parameters are then stored in memory registers of parameter memory 22 for use by read channel 18 during read operations. The operational parameters have been previously calculated, normally during burn-in, and stored in ROM 29. The operational parameters adapt or optimize the circuitry of read channel 18 to the specific physical and magnetic characteristics of disk drive mass storage system 30. Throughout the life of disk drive mass storage system 30, the various physical and magnetic characteristics may change. These changes may affect the operation of disk drive mass storage system 30. To account for these changes, various software routines or utilities may be executed at various times during the life of disk drive mass storage system 30 to modify or recalculate the various operational parameters that are stored in ROM 29 and provided to parameter memory 22 during start-up.

After the initialization routine is complete, data may be read from or written to disk/head assembly 12. Servo control 20 provides location information so that the read/write heads may be properly positioned on the disks to read and write data. In general, the operation of disk drive mass storage system 30 may be divided into read operations and non-read operations. Read operations involve the reading of data from the disks of disk head assembly 12 and non-read operations include write operations, servo operations, and times when the system is idle. Clock signals control both read operations and non-read operations.

During a read operation, host 32 initiates a request for data. After the read/write heads of disk/head assembly 12 are properly positioned, an analog data signal is provided to preamplifier 14. Read channel 18 receives the analog data signal from preamplifier 14, processes the analog data signal, and provides a corresponding digital data signal. This involves using various circuitry modules and techniques for synchronously sampling the analog data signal and detecting a digital signal. Each circuit module of read channel 18 receives an input waveform signal supplied from a prior circuit module. A read clock signal ensures that the data signal is synchronously sampled in the correct manner. Read channel 18 provides the digital data signal to disk control 24 through data/parameter path 13. Disk control 24 provides various digital logic control and arbitration circuitry between SSD channel 10, host 32, RAM 26, microprocessor 28, and ROM 29 during both read and write operations. The digital data is then stored in RAM 26 until microprocessor 28 communicates to host 32 that the data is ready to be transferred. Host 32 may be a system bus such as the system bus of a personal computer.

During a write operation, a digital data signal is received from host 32 and ultimately stored on disk/head assembly 12. Digital data is initially provided from host 32 to control circuitry 11. Control circuitry 11 stores the digital data in RAM 26. Microprocessor 28 schedules a series of events so that the data may then be transferred from RAM 26 to disk/head assembly 12, through write channel 16. This data exchange occurs through data/parameter path 13. RAM 26 first provides the data to write channel 16. Write channel 16 encodes the digital data and places the data in serial format. Write channel 16 then provides the data to disk/head assembly 12 after the heads of disk/head assembly 12 have been properly positioned to write or store the data at an appropriate location on the disk. The operation and timing of write channel 16 is controlled by a write clock signal.

Figure 2:
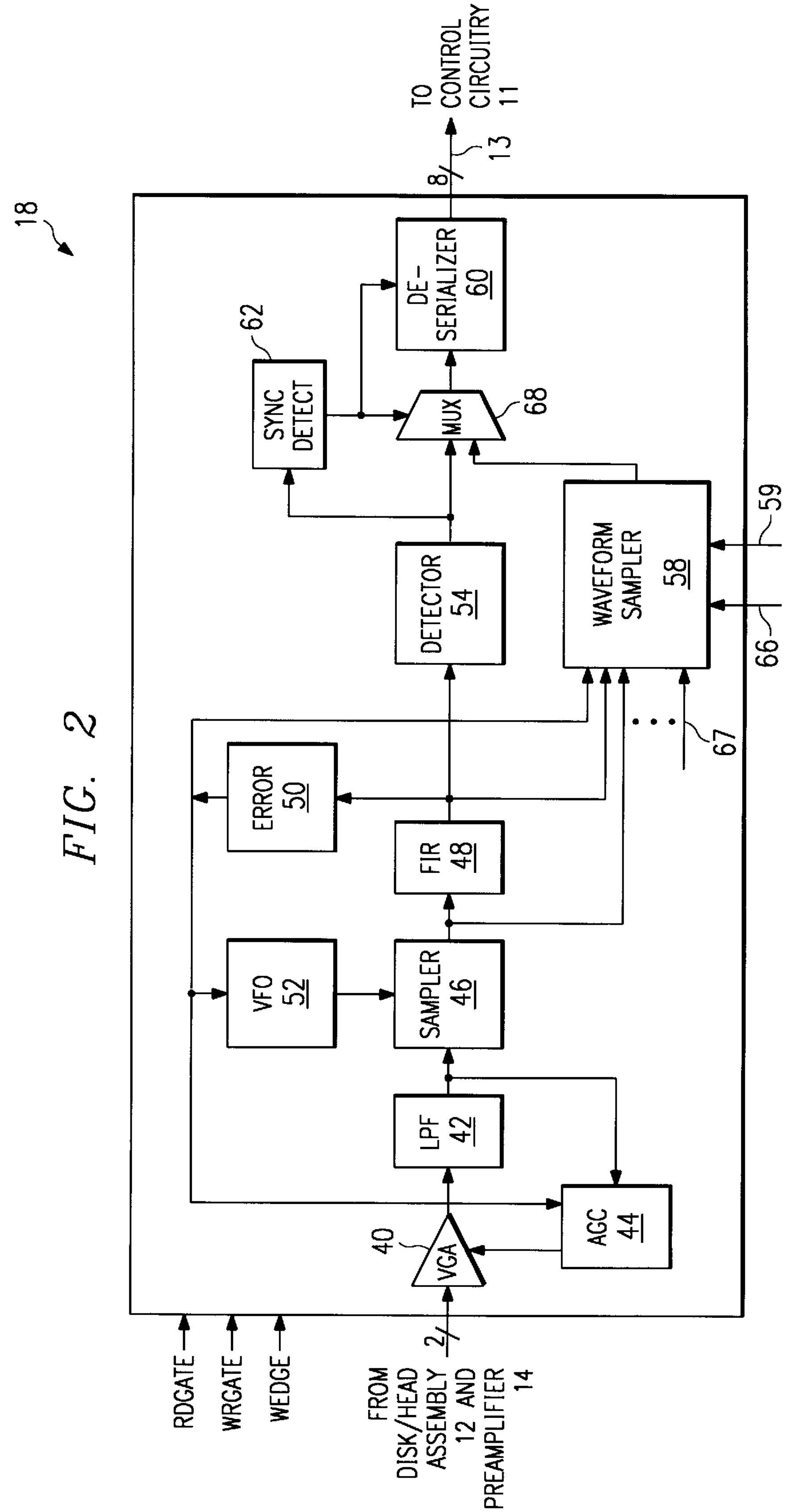
FIG. 2 is a block diagram illustrating a read channel of the mass storage system.

FIG. 2 is a block diagram of read channel 18 of SSD channel 10. Read channel 18 includes a variety of circuit modules used to process and condition the waveform data signal received from preamplifier 14 and disk/head assembly 12 during a read operation. These circuit modules include variable gain amplifier 40, automatic gain control 44, low pass filter 42, sampler 46, finite impulse response filter (FIR) 48, error circuit 50, variable frequency oscillator (VFO) 52, waveform sampler 58, detector 54, synchronization detect circuit (sync detect) 62, deserializer multiplexer 68, and deserializer 60. Variable gain amplifier 40 receives the waveform data signal from preamplifier 14. The amplitude of the waveform data signal may vary with each track, head, platter, and head position. Variable gain amplifier 40, along with automatic gain control 44, correct for these variations and ensure that the waveform data signal is amplified to the desired level of amplification needed by read channel 18. Automatic gain control 44 may receive an input from either error circuit 50 or from the output of low pass filter 42, and provides a gain signal to variable gain amplifier 40. Error circuit 50 calculates an error waveform signal which serves as an input to automatic gain control 44 during discrete time signal processing. Low pass filter 42 provides a filtered output which serves as an input to automatic gain control 44 during continuous time signal processing. The amplified output waveform signal of variable gain amplifier 40 is provided to low pass filter 42 for further processing in read channel 18.

Low pass filter 42 receives the amplified output waveform signal and filters the signal to remove unwanted noise, such as high frequency noise and provides waveform shaping with boost. A filtered output waveform signal is then provided to sampler 46 for further processing. Low pass filter 42 may be a continuous time seventh order filter designed using Gm/C components which is programmable to set cutoff frequency and boost. This output signal may also serve as an input to automatic gain control 44 as mentioned above.

Sampler 46 receives the filtered output waveform signal from low pass filter 42 and converts the signal from continuous time to discrete time. Sampler 46, controlled by VFO 52, samples the output waveform signal and holds its value until the next sample time. VFO 52 controls sampler 46 by providing a signal that indicates when sampler 46 should sample and hold the signal. The output of sampler 46 is an analog waveform signal having discrete values. Each discrete value corresponds to the value or amplitude of the input waveform signal to sampler 46 at the time the signal was sampled and held as controlled by VFO 52. Sampler 46 may be a sample and hold circuit such as a circular sample and hold circuit that is time sequence multiplexed to FIR 48 so that the correct time sequenced value is presented to FIR 48.

The discrete analog waveform output of sampler 46 serves as the input to FIR 48. FIR 48 receives the discrete analog waveform signal and employs a plurality of filter coefficients or taps to filter the signal. FIR 48 allows the signal to be equalized to the target function of detector 54. FIR 48 may be a five tap filter with coefficients set by programmable digital circuitry. For example, FIR 48 may receive five digital coefficients or filter tap weights that are converted to an analog value through a digital-to-analog converter. Each coefficient is then provided to a separate multiplier. Each multiplier also receives a consecutive output of sampler 46. The outputs of all five of the multipliers are provided to an adder, such as an analog adder, which serves as the output of FIR 48. When sampler 46 receives another signal, the consecutive sampler outputs provided to each multiplier is shifted to the next multiplier such that a new sampler output is provided to the first multiplier and the oldest sampler output is dropped from the fifth multiplier. The outputs of all five of the multipliers are once again provided to the analog adder to produce another discrete output level of FIR 48. The number of taps and multipliers may vary. FIR 48 then provides a discrete output signal having the desired channel response that serves as an input signal to detector 54.

Detector 54 receives the equalized, discrete signal provided at various threshold levels from FIR 48. Detector 54 analyzes the signal to produce a digital data output signal. In one embodiment, detector 54 may be a maximum likelihood detector or Viterbi decoder implementing the Viterbi algorithm for decoding. Assuming that detector 54 is implemented as a Viterbi decoder, detector 54 includes an offset, a metric, and a trellis for decoding the signal. The offset may be programmable operational parameters and stored in storage registers. The output of the metric is provided to the trellis which serves as a decision tree for sequence decoding the data. The trellis provides a digital data output signal which serves as the output of detector 54.

Detector 54 provides a digital data signal output corresponding to the data stored on disk/head assembly 12. Sync detect 62 detects the presence of a synchronization byte or synchronization field in the digital data signal and enables a signal provided to deserializer 60 indicating the detection of the synchronization field. Sync detect 62 may search for the synchronization field over a predefined period or "window" of time that the synchronization field should be present. Deserializer 60 formats the digital data signal and supplies the digital data signal to data/parameter path 13. The digital data is ultimately supplied to host 32, as shown in FIG. 1.

Error circuit 50 calculates an error signal based upon receiving the output signal of FIR 48. The output of error circuit 50 serves as an input to VFO 52 and automatic gain control 44, as discussed above. The analog error output is an analog value indicating how far the sampled signal is from the ideal target value. This may be used when determining or establishing the various operational parameters of read channel 18.

VFO 52 is used to control the sample time of sampler 46. During a read operation, VFO 52 receives the error signal and adjusts the frequency by an amount corresponding to the value of the error signal. VFO 52, sampler 46, FIR 48, and error circuit 50 together provide a sampled time phase locked loop function to read channel 18.

Waveform sampler 58 receives one of a plurality of read channel waveform signals, samples the signal, and provides a digital waveform sampler signal at its output. Waveform sampler 58 may receive any of a plurality of read channel waveform signals such as the output waveform signals of sampler 46, FIR 48, and error circuit 50. Nth waveform signal 67 is shown to illustrate that any number of waveform signals from read channel 18 may be sampled by waveform sampler 58.

Figure 3:
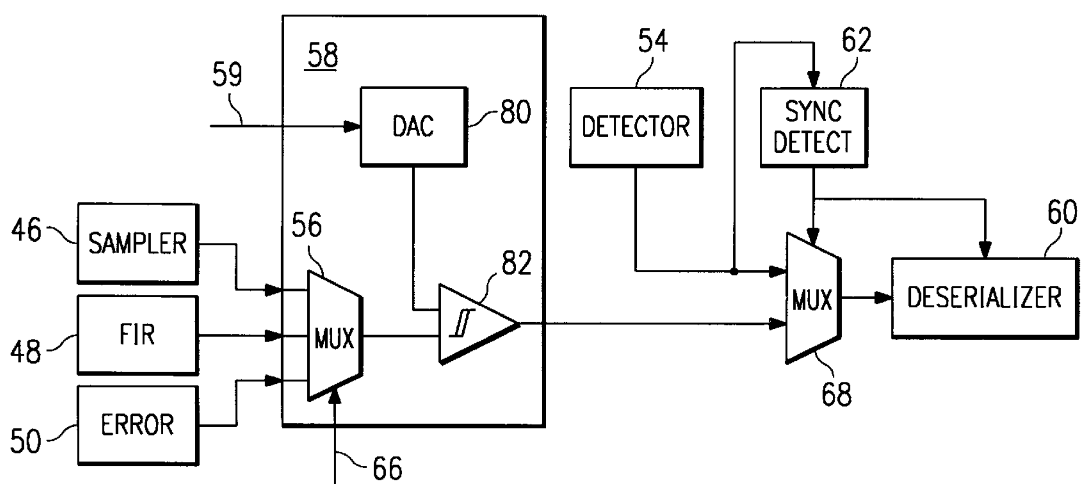
FIG. 3 is a block diagram illustrating a waveform sampler of the read channel.

Waveform sampler multiplexer control 66 is a control signal provided to waveform sampler 58 to control which read channel waveform signal should be selected and sampled by waveform sampler 58. Once a read channel waveform signal is selected, it is sampled by waveform sampler 58. The selected waveform signal may be sampled by comparing its value to a threshold signal 59 as discussed more fully below and as shown in FIG. 3. Additional read operations may take place to further sample the selected read channel waveform signal. After the selected read channel waveform signal is sampled, a digital waveform sampler signal is provided at the output of waveform sampler 58.

Deserializer multiplexer 68 receives the digital waveform sampler signal from waveform sampler 58 along with the digital data signal from detector 54. Sync detect 62 controls the operation of deserializer multiplexer 68 and enables deserializer multiplexer 68 to provide one of these digital signals to deserializer 60 when a synchronization field is detected in the digital data signal. Read channel 18 may operate in a waveform sampling mode or a normal mode as selected by a control signal not shown in FIG. 2. The particular mode that read channel 18 is operating in determines which of the two digital input waveform signals are provided to deserializer 60 by deserializer multiplexer 68. Deserializer multiplexer 68 provides the digital waveform sampler signal to deserializer 60 when read channel 18 is in waveform sampling mode and provides the digital data signal to deserializer 60 when read channel 18 is in normal mode.

The operation of read channel 18 begins when RDGATE signal is enabled indicating that a read operation is to be performed in read channel 18. Read channel 18 may be operating in either waveform sampling mode or normal mode during a read operation. Variable gain amplifier 40 receives a waveform data signal and provides appropriate gain or boost to the waveform signal which is then filtered by low pass filter 42. Sampler 46, under the control of VFO 52, receives the output signal of low pass filter 42 and samples the signal. Sampler 46 provides a discrete analog waveform to FIR 48. FIR 48 further conditions and equalizes the signal and provides an output waveform signal having the desired channel response for detector 54. Detector 54 receives the equalized signal from FIR 48 and analyzes the signal to produce a digital data output signal corresponding to the stored data. The digital output signal is provided to deserializer multiplexer 68.

Waveform sampler 58, during the read operation just described, receives a plurality of read channel signals, one of which will be selected and sampled. For example, the output of FIR 48 may be provided to waveform sampler 58 and selected. In this case, waveform sampler multiplexer control 66 selects the output of FIR 48 to be sampled by waveform sampler 58. Threshold signal 59 is provided to waveform sampler 58 for comparison to the output of FIR 48. Sync detect 62 enables a control signal that is provided to deserializer multiplexer 68 indicating that a synchronization field has been detected in the digital data signal. The selected digital signal is then provided to data/parameter path 13 after being placed in a proper data format by deserializer 60.

Threshold signal 59 is then provided at a variety of values and is compared to the output of FIR 48 or whatever signal is selected for sampling in waveform sampler 58. This comparison of each value of threshold signal 59 occurs over successive or multiple read operations. As a result of each of these comparisons over successive read operations, waveform sampler 58 produces a digital waveform sampler signal which is provided to control circuitry 11 through data/parameter path 13.

FIG. 3 is a block diagram of waveform sampler 58 as implemented in read channel 18. Waveform sampler 58, in this embodiment, includes a digital-to-analog converter (DAC) 80, a comparator 82, and a waveform sampler multiplexer 56 that is controlled by waveform sampler multiplexer control 66. Waveform sampler 58 receives the output waveform signals of sampler 46, FIR 48, and error circuit 50 at waveform sampler multiplexer 56. Waveform sampler 58 may receive any of a plurality of read channel waveform signals. Waveform sampler multiplexer control 66 provides a control or selection signal to waveform sampler multiplexer 56 for selection of one of the input signals from the read channel. The selected read channel waveform signal is provided as an input to comparator 82.

DAC 80 receives a digital threshold signal 59 and converts this digital signal to an analog threshold signal which is also provided as an input to comparator 82. Comparator 82 compares the analog threshold signal to the selected read channel waveform signal and provides a digital waveform sampler signal to deserializer multiplexer 68 along with the digital data signal output of detector 54 as discussed above for FIG. 2. Sync detect 62 enables a control signal that is provided to deserializer multiplexer 68 when a synchronization field is detected. When read channel 18 is in waveform sampling mode, deserializer multiplexer 68 provides the digital waveform sampler signal to deserializer 60. The signal is then provided to control circuitry 11 through data/parameter path 13 after being placed in parallel format by deserializer 60.

In operation, read channel 18 is placed in waveform sampling mode and a read operation is performed in read channel 18. As a result of this read operation, a digital data output signal, corresponding to the stored data, is provided to deserializer multiplexer 68 from detector 54. Prior to the read operation, a read channel waveform signal is selected to be sampled by waveform sampler 58. For example, if the output waveform signal of FIR 48 is to be sampled, waveform sampler multiplexer control 66 provides a signal to waveform sampler multiplexer 56 to select the output waveform signal of FIR 48. This signal is then provided to comparator 82. Threshold signal 59 is provided to DAC 80 at a desired first threshold level. Threshold signal 59 may be a digital signal at a fixed or constant value. DAC 80 converts threshold signal 59 to a corresponding analog threshold signal and provides this signal to comparator 82 along with the analog output waveform signal of FIR 48.

Comparator 82 produces a digital waveform sampler signal by comparing the two signals and determining which signal is greater at each particular sample point. Comparator 82 produces either a "one" or a "zero" as a result of each comparison. A "one" is produced when the output waveform signal of FIR 48 is greater than the analog threshold signal, and a "zero" is produced when the output waveform signal of FIR 48 is less than the threshold signal. The digital waveform sampler signal is provided to deserializer multiplexer 68. Sync detect 62 enables deserializer multiplexer 68 to provide the digital waveform sampler signal when a synchronization field is detected in the digital data signal. The digital waveform sampler signal is provided to deserializer 60 and then to control circuitry 11 through data/parameter path 13. Sync detect 62 also provides framing information to deserializer 60 such that consecutive read operations are properly aligned in the read data. The digital waveform sampler signal may then be stored in RAM 26 of control circuitry 11 for later processing by microprocessor 28 (see FIG. 1).

After the output waveform signal of FIR 48 for one sector has been compared to the threshold signal, threshold signal 59 is changed to a new constant value and the comparison steps described above are repeated. This may involve performing a plurality read operations of the same sector so that different values of threshold signal 59 may be compared with the output waveform signal of FIR 48. This results in the creation of a plurality of digital waveform sampler signals, one for each value of threshold signal 59 that is provided and compared. All of these signals are supplied to data/parameter path 13. A plurality of read operations and of corresponding different constant values of threshold signal 59 are compared to the output waveform signal of FIR 48 until enough sampled digital data is obtained to later reconstruct or regenerate the output waveform signal of FIR 48 at a desired resolution and accuracy.

Microprocessor 28, shown in FIG. 1, may retrieve and analyze the digital waveform sampler signal data that has been provided through data/parameter path 13 to RAM 26. Microprocessor 28 may execute any of a number of algorithms implementing known mathematical techniques to receive the sampled digital data and reconstruct or regenerate the original output waveform signal of FIR 48. Algorithms such as systems identification and least means squared may be used. The reconstructed signal may then be used in establishing various operational parameters or circuit coefficients that can be used by read channel 18 to further enhance and optimize performance.

Figure 4:
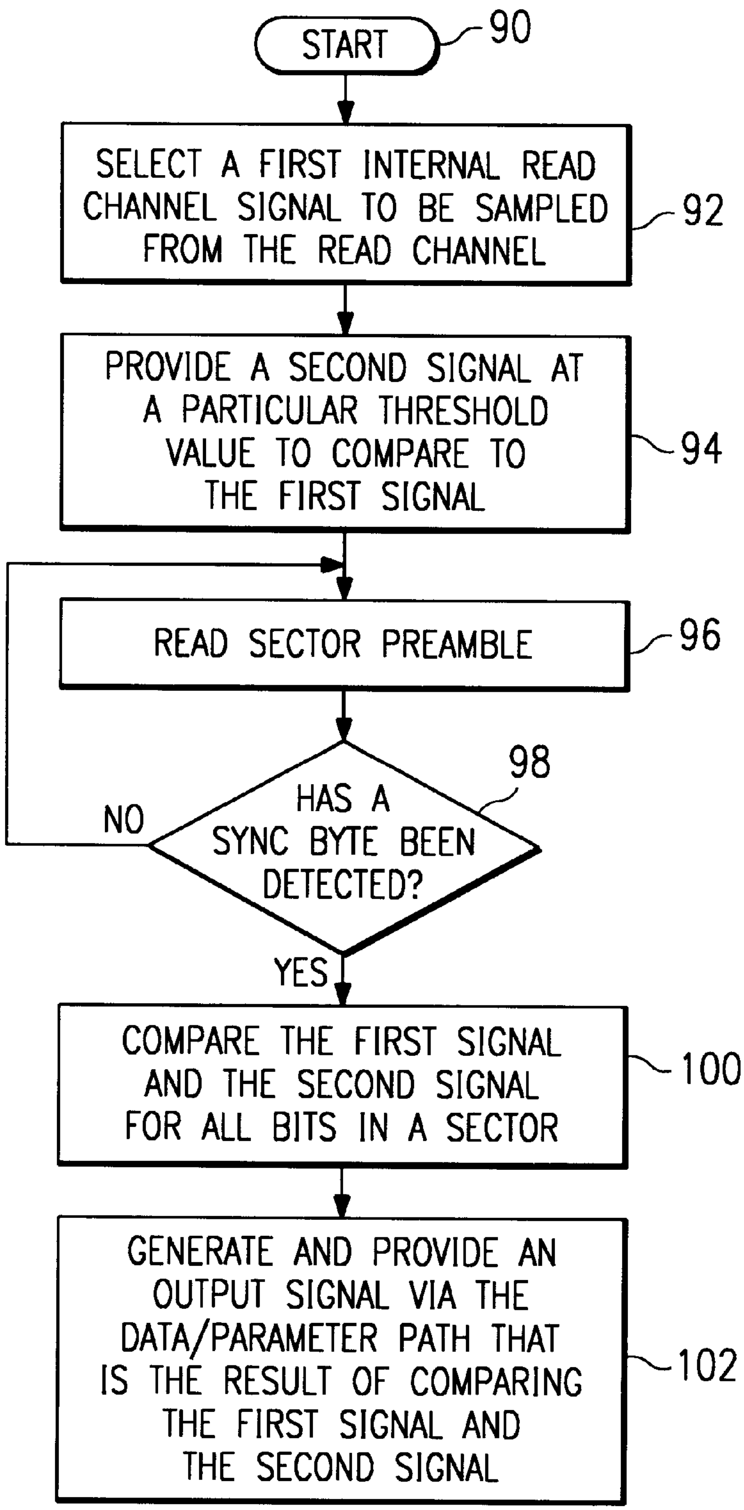
FIG. 4 is a flow chart illustrating a method for sampling a waveform from the read channel of the mass storage system.

FIG. 4 is a flow chart illustrating a method for sampling a waveform from a read channel of a mass storage system. The method includes various steps beginning at start block 90 and ending at block 102. The method begins at start block 90 and proceeds to step 92. Step 92 includes selecting any of a plurality of internal read channel signals to sample. The read channel signal to be sampled is known as the first signal.

The method then proceeds to step 94 which includes providing a second signal that will be compared to the first signal selected in step 92. Next, step 96 involves performing a read sector preamble in the read channel to prepare the read channel for a read operation. This may involve automatic gain control and variable gain amplifier functions. The method then proceeds to step 98 which involves waiting for the detection of a synchronization field or sync byte in the read channel. Until a sync byte is detected, the read sector preamble step continues preparing the read channel for a read operation. Once a sync byte has been detected, the method proceeds to step 100.

Step 100 includes comparing the first signal and the second signal for all bits in a sector. This may be done with a comparator circuit. Finally, step 102 involves generating an output comparison signal in response to each comparison of the first signal and the second signal or threshold signal in step 100. The output comparison signal may be the output of a comparator circuit and may indicate whether or not the first signal exceeds the second signal. The comparison signal of step 102 is then provided to other circuitry of the mass storage system, such as the control circuitry, through the data/parameter path. A comparison is made for all bits in a sector. The data/parameter path is the same path that the read channel uses to provide digital data signals to the control circuitry during read operations.

To summarize the preferred embodiment of the present invention, a read channel is provided that contains a waveform sampler that allows any of a variety of read channel waveform signals to be conveniently and easily accessed and sampled. The sampled waveform may then be provided through the same data path that is used to provide read data signals from the read channel to the control circuitry during a read operation. The sampled signal may be reconstructed using the existing processor in the control circuitry of the HDD. The reconstructed waveform may then be used to calculate various operational parameters used in optimizing the operation of the read channel. In this manner, the need for additional or dedicated internal processing circuitry located is eliminated resulting in substantial savings. Also, operational parameters may be much more easily calculated at any time because of the accessibility of the read channel signals and the ability to provide the sampled waveform signals to existing processing circuitry without having to provide external processing circuitry.

Thus, it is apparent that there has been provided, in accordance with the present invention, a waveform sampler and method for sampling a signal from a read channel that satisfies the advantages set forth above. Although the preferred embodiment has been described in detail, it should be understood that various changes, substitutions, and alterations can be made herein. For example, a variety of techniques could be used to sample the read channel waveforms before they are supplied to the control circuitry through the data/parameter path. Also, the direct connections illustrated herein could be altered by one skilled in the art such that two devices are merely coupled to one another through an intermediate device or devices without being directly connected while still achieving the desired results demonstrated by the present invention. Other examples of changes, substitutions, and alterations are readily ascertainable by one skilled in the art and could be made without departing from the spirit and scope of the present invention as defined by the following claims.

What is claimed is:

1. A read channel comprising:

a plurality of circuit modules having operational parameters operable to receive and process a waveform data signal, the plurality of circuit modules operable to generate a digital data signal from the waveform data signal;

a waveform sampler operable to receive a processed waveform signal from any one of the plurality of circuit modules, the waveform sampler operable to sample the processed waveform signal and to generate a digital waveform sampler signal therefrom; and circuitry operable to select one of the digital data signal and the digital waveform sampler signal as an output onto a datapath;

control circuitry coupled to said plurality of circuit modules through the datapath, the control circuitry operable to receive the digital read signal through the datapath, said control circuitry being operable to read said operational parameters for said plurality of circuit modules and providing said operational parameters to said plurality of circuit modules through the datapath.

2. The read channel of claim 1 wherein the plurality of circuit modules comprise:

a variable gain amplifier operable to receive the waveform data signal and an error signal, the variable gain amplifier further operable to amplify the waveform data signal to generate an amplified data signal;

a filter circuit operable to receive the amplified data signal from the variable gain amplifier and to filter and equalize the amplified data signal to generate a filtered/equalized data signal therefrom;

an error circuit operable to receive the filtered/equalized data signal from the filter circuit and to generate the error signal, the error circuit operable to provide the error signal to the variable gain amplifier; and a detector operable to receive the filtered/equalized data signal from the filter circuit and to generate the digital data signal therefrom.

3. The read channel of claim 2 wherein the waveform sampler includes a comparator operable to receive the processed waveform signal from one of the plurality of circuit modules and a threshold signal, the comparator operable to compare the processed waveform signal and the threshold signal and to generate the digital waveform sampler signal in response.

4. The read channel of claim 3 wherein the processed waveform signal from one of the plurality of circuit modules is the filtered/equalized data signal.

5. The read channel of claim 3 wherein the processed waveform signal from one of the plurality of circuit modules is the error signal.

6. The read channel of claim 2 wherein the detector is a Viterbi detector.

7. The read channel of claim 1 wherein the waveform sampler includes a comparator operable to receive the processed waveform signal from one of the plurality of circuit modules and a threshold signal, the comparator operable to compare the processed waveform signal and the threshold signal and to generate a digital waveform sampler signal in response.

8. The read channel of claim 1 wherein the waveform sampler comprises:

a multiplexer operable to receive a plurality of processed waveform signals from the plurality of circuit modules, the multiplexer operable to receive a control signal for selecting and providing one of the plurality of processed waveform signals;

a digital-to-analog converter operable to receive a digital threshold signal and operable to generate a corresponding analog threshold signal;

a comparator operable to receive the one of the plurality of processed waveform signals from the multiplexer and the analog threshold signal from the digital-to-analog converter, the comparator operable to compare the one of the plurality of processed waveform signals and the analog threshold signal, the comparator operable to generate a digital waveform sampler signal in response.

9. The read channel of claim 8 wherein the circuitry operable to select one of the digital data signal and the digital waveform sampler signal as an output onto a data/parameter path provides the selected signal onto the data/parameter path in parallel data format.

10. The read channel of claim 1 wherein the digital waveform sampler signal is provided to a memory device.

11. A disk drive mass storage system comprising:

a disk/head assembly having a magnetic disk and a read/write head, the read/write head operable to receive a write signal and to store the write signal onto the magnetic disk, the read/write head operable to generate a read signal from the magnetic disk and to provide the read signal;

a write channel operable to provide the write signal to the read/write head;

a read channel having a plurality of circuit modules, the plurality of circuit modules having data parameters operable to receive the read signal from the read/write head of the disk/head assembly and to process the read signal, the plurality of circuit modules operable to generate a digital read signal from the read signal, the read channel also having a waveform sampler operable to receive a processed waveform signal from any one of the plurality of circuit modules, the waveform sampler operable to sample the processed waveform signal and to generate a digital waveform sampler signal, the read channel operable to select one of the digital read signal and the digital waveform sampler signal as an output onto a datapath; and control circuitry coupled to the read channel and write channel through the data/parameter path, the control circuitry having a microprocessor and a memory device, the control circuitry operable to control the operation of the disk drive mass storage system, the control circuitry further operable to receive one of the digital read signal and the digital waveform sampler signal from the read channel through the data/parameter path, said control circuit being operable to read the operational parameters for said plurality of circuit modules and providing said operational parameter to said plurality of circuit modules through the datapath.

12. The disk drive mass storage system of claim 11 wherein the plurality of circuit modules of the read channel comprises:

a variable gain amplifier operable to receive the read signal and an error signal, the variable gain amplifier further operable to amplify the read signal to generate an amplified data signal;

a filter circuit operable to receive the amplified data signal from the variable gain amplifier and to filter and equalize the amplified data signal to generate a filtered/equalized data signal therefrom;

an error circuit operable to receive the filtered/equalized data signal from the filter circuit and to generate the error signal, the error circuit operable to provide the error signal to the variable gain amplifier; and a detector operable to receive the filtered/equalized data signal from the filter circuit and to generate the digital read signal therefrom.

13. The disk drive mass storage system of claim 12 wherein the waveform sampler of the read channel includes a comparator operable to receive a processed waveform signal from one of the plurality of circuit modules and a threshold signal, the comparator operable to compare the processed waveform signal and the threshold signal and to generate a digital waveform sampler signal.

14. The disk drive mass storage system of claim 13 wherein the signal received by the waveform sampler is the filtered/equalized data signal.

15. The disk drive mass storage system of claim 11 wherein the waveform sampler of the read channel includes a comparator operable to receive the processed waveform signal and a threshold signal, the comparator further operable to compare the processed waveform signal and the threshold signal to generate the digital waveform sampler signal.

16. The disk drive mass storage system of claim 11 wherein the waveform sampler of the read channel comprises:

a multiplexer operable to receive a plurality of the processed waveform signals, the multiplexer operable to receive a control signal for selecting and providing one of the plurality of processed waveform signals;

a digital-to-analog converter operable to receive a digital threshold signal and to generate a corresponding analog threshold signal;

a comparator operable to receive the one of the plurality of processed waveform signals from the multiplexer and the analog threshold signal from the digital-to-analog converter, the comparator operable to compare the one of the plurality of processed waveform signals and the analog threshold signal, the comparator operable to generate a digital waveform sampler signal in response and to provide the digital waveform sampler signal to the control circuitry through the data/parameter path.

* * * * *

UNITED STATES PATENT AND TRADEMARK OFFICE

CERTIFICATE OF CORRECTION

PATENT NO. : 5,987,562
DATED : November 16, 1999
INVENTOR (S) : Kerry C. Glover

It is certified that error appears in the above-identified patent and that said Letters Patent is hereby corrected as shown below:

Title Page, insert the following, after item [22],

--[60] Provisional application No. 60/013,094, filed March 08, 1996--

Column 1, line 4, insert the following:
--CROSS REFERENCE TO RELATED APPLICATION
Reference is made to and priority claimed from U.S. provisional application Ser. No. 60/013,094, March 08, 1996--

Signed and Sealed this

Fifth Day of September, 2000

Attest:

Q. TODD DICKINSON

Attesting Officer

*Director of Patents and Trademarks*